(12) United States Patent
Kurokawa

(10) Patent No.: US 8,085,023 B2
(45) Date of Patent: Dec. 27, 2011

(54) SIGNAL GENERATION CIRCUIT, ELECTRIC POWER CONVERSION CONTROL CIRCUIT AND LSI FOR ELECTRIC POWER CONVERSION CONTROL

(75) Inventor: Fujio Kurokawa, Yanagawa-machi (JP)

(73) Assignee: Nagasaki University, National University Corporation, Nagasaki (JP)

( * ) Notice: Subject to any disclaimer, the term of this patent is extended or adjusted under 35 U.S.C. 154(b) by 388 days.

(21) Appl. No.: 12/224,204

(22) PCT Filed: Feb. 21, 2007

(86) PCT No.: PCT/JP2007/053711
§ 371 (c)(1),
(2), (4) Date: Nov. 20, 2008

(87) PCT Pub. No.: WO2007/105487
PCT Pub. Date: Sep. 20, 2007

(65) Prior Publication Data
US 2009/0167393 A1    Jul. 2, 2009

(30) Foreign Application Priority Data

Feb. 21, 2006  (JP) ................... 2006-044498

(51) Int. Cl.
*G05F 1/575* (2006.01)
(52) U.S. Cl. ........................................ 323/283

(58) Field of Classification Search .................. 323/282, 323/283, 284
See application file for complete search history.

(56) References Cited

U.S. PATENT DOCUMENTS 5,408,064 A  *  4/1995  Takahara ................... 219/69.18

FOREIGN PATENT DOCUMENTS

| JP | A-62-079387 | 4/1987 |
| JP | A-05-249260 | 9/1993 |
| JP | A-2004-336852 | 11/2004 |

* cited by examiner

*Primary Examiner* — Gary L Laxton
(74) *Attorney, Agent, or Firm* — Oliff & Berridge, PLC

(57) ABSTRACT

The control accuracy equal with the case controlled according to a reference signal with a high clock frequency when the electric power is converted is obtained according to a reference signal with a low clock frequency. The quantity of signal S3 of the time that corresponds to the difference of EO in the output voltage to reference voltage EREF by circuit 12 of the generation of quantity of signal of time is generated synchronizing with reference timing signal S1. The phase generates the class of the phase-shift signal of n piece for which only [Cycle of S0/]/n is late one by one by phase-shift signal generation circuit 13, counter circuit 14, and digital addition circuit 15, these numbers are counted respectively, and the count value of n piece is added. The control signal S5that corresponds to TON between when adding value ADD is input with decision circuit 16 of on time of the switch element and control signal generation circuit 17 and it turns it on is generated.

6 Claims, 11 Drawing Sheets

(A)

(B)

(C)

SIGNAL GENERATION CIRCUIT, ELECTRIC POWER CONVERSION CONTROL CIRCUIT AND LSI FOR ELECTRIC POWER CONVERSION CONTROL

TECHNICAL FIELD (1) Electric power conversion control circuit and LSI for electric power conversion control that can obtain the control accuracy equal with the case controlled according to reference signal by using low clock frequency, when the electric power is converted.

(2) Signal generation circuit for the pulse width control that can generate pulse width signal of high resolution accuracy corresponding to time concerned set value according to time given by integer value.

BACKGROUND OF THE TECHNICAL ART

Digital LSI including the microprocessor is being used for the electric power conversion control circuit (in this detailed statement, it is said, "electric power conversion control circuit") such as the DC/DC converter for the following reasons. (1)The influence by the temperature change is a little. (2) Various parameters can be set to programmable.

PROBLEM TO BE SOLVED BY THE INVENTION

So far, a electric power conversion control circuit is known. This electric power conversion control circuit replaces the difference between output voltage $E_O$ and the reference voltage $E_{REF}$ of the controlled object (target value voltage) with the time amount and detect it, and decides the duty of the control signal (rectangular wave) based on the time amount. This electric power conversion control circuit can control high accuracy by detecting the time amount by using the clock generator of the frequency of about 50 MHz or more.

Therefore, the clock generator with a high price is necessary to be controlled by the frequency of 50 MHz or more.

The purpose of the present invention is to offer electric power conversion control circuit and LSI for the electric power conversion control that can obtain detection accuracy equal with control according to reference signal with high clock frequency by using standard clock signal with low frequency.

Other purpose of this invention is to offer pulse width control signal generation circuit can obtain detection accuracy equal with control according to reference signal with high clock frequency by using standard clock signal with low frequency.

MEANS FOR SOLVING PROBLEM

The present invention characterizes below
(1) The electric power conversion control circuit that generates control signals corresponding to on-time (on period) of each switch element, comprising,
the phase shift signal generation circuit that inputs the reference clock signal, and generates the group that consists of n phase shift signals that the phase delays one by one by [an one cycle of the reference clock signal]/n, the first reference timing generation circuit that the first reference signal,
the control signal generation circuit that inputs n phase shift signals synchronizing with said the second reference timing signal, generates the control signal of accuracy n time the reference clock signal corresponding to said on-time, wherein,
the said control signal generation circuits has,
the distribute circuit that distributes said on-time value $N_2$n to integers $N_{21}, N_{22}, N_{23}, \ldots, N_{2N}$, so that the following requirement is met $$N_{21}+N_{22}+\ldots+N_{2n}=N_2$$

$$N_{21} \geq N_{22}+\ldots+N2n$$

n counters that output the pulses of number corresponding to value that is preset for the phase to delay [one cycle of the reference clock signal]/n one by one,
the pulse synthesis circuit that synthesizes the output pulses of said counters, and outputs the synthesized signal as the control signal.

(2) The pulse width control signal generation circuit of (1) wherein, said phase shift signal generation circuit consists of the delay (n−1) circuits, and each delay circuit delays the phase one by one by [one cycle of the reference clock signal]/n, and generates said phase shift signal.

(3) The electric power conversion control circuit using the said pulse width control signal generation circuit, of (1) or (2) wherein,
the second timing generation circuit that generates the second reference timing signal,
the time amount signal generation circuit that inputs the reference voltage and output voltage of power conversion circuit and generates the time amount signal corresponding to difference between standard said reference, and said output voltage synchronizing with said the second timing signal,
the count circuit that inputs n phase shift signals, counts these pulse numbers respectively synchronizing with the first reference timing signal, and outputs n count-values digitally when amount of signal of time is active,
the digital addition circuit that inputs said n count-values, adds these values, and outputs this adding value as a value corresponding to said time amount signal,
the switch element on-time deciding circuit that inputs said adding value, decides said on-time, and outputs as the integer value.

(4) The electric power conversion control circuit of (3), wherein, said circuit have, n AND-gates that input the said time amount signal input to the first terminal and said phase shift signal input to the second terminal, and output these logical product,
n counters that count the output pulse from said n AND gate respectively, and output each count value digitally.

(5) The electric power conversion control circuit of (3), or (4), wherein, said electric power conversion circuit is the DC/DC converter.

(6). LSI for electric power conversion control that is packaged from the electric power conversion control circuit of (3), (4), or (5).

EFFECT OF THE INVENTION

By using the electric power conversion control circuit and LSI for the electric power conversion control of the present invention, when the electric power is converted the control, the accuracy equal with the control according to a reference signal with a high clock frequency can be obtained from the reference clock signal with low frequency.

By using the pulse width control signal generation circuit of the present invention, the control accuracy equal with the control according to a reference signal with a high clock frequency can be obtained from the reference clock signal with low frequency.

EXAMPLE

Figure 1:
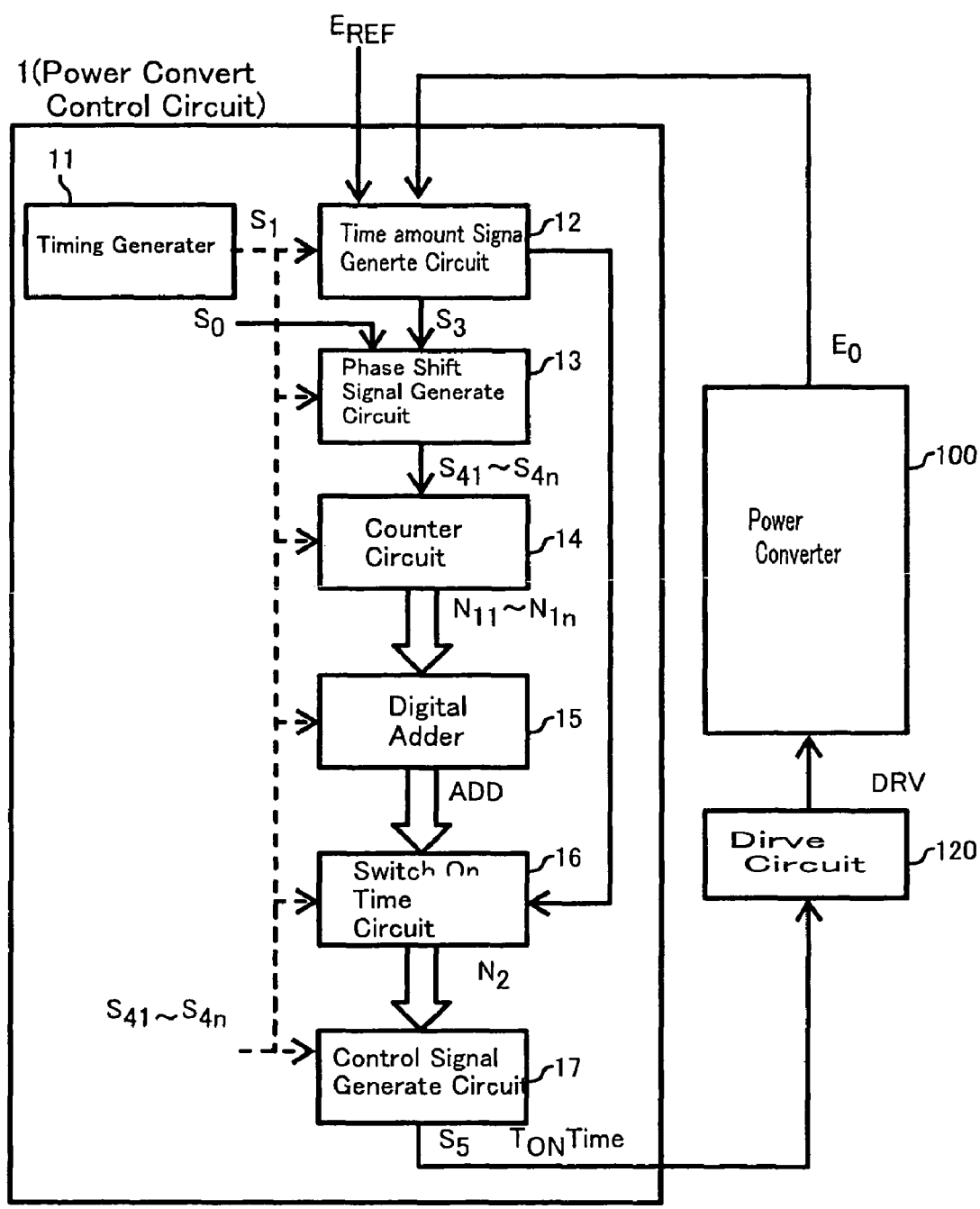
FIG. 1 is a block diagram that shows the electric power conversion control circuit in the embodiment of the present invention.

FIG. 1 is a diagram for explaining the embodiment of the present invention.

The electric power conversion control circuit 1 is packaged in LSI for the electric power conversion control, and generates control signal $S_5$ corresponding to on-time $T_{ON}$. The control signal S5 generated by the electric power conversion control circuit 1 is sent to the drive circuit 120, and the drive circuit 120 sends the driving signal DRV to the electric power conversion circuit 100.

In this embodiment the electric power conversion circuit 100 is possible to apply to the electric power conversion circuit output as direct current. The circuit 100 can be apply to the DC/DC converter typically, though the circuit 100 can be apply to AC/DC converter too.

The electric power conversion control circuit 1 has the timing generation circuit 11, the time amount circuit signal generation circuit 12, the phase-shift signal generation circuit 13, the counter circuit 14, the digital addition circuit 15, the switch element on-time decision circuit 16, and the control signal generation circuit 17.

The timing generation circuit 11 generates the reference timing signal $S_1$. The cycle of on-off of the electric power conversion circuit 100 is decided depending on the reference timing signal $S_1$.

The time amount signal generation circuit 12 inputs the reference voltage $E_{REF}$ and the voltage output $E_O$ of the electric power conversion circuit 100, and generates the time amount signal $S_3$ corresponding to the difference of the output voltage $E_O$ to reference voltage $E_{REF}$ synchronizing with reference timing signal $S_1$. The CR Circuits of two sets (Refer to FIG. 3) described later can be typically used to convert the difference of the output voltage $E_O$ to the reference voltage $E_{REF}$ into the time amount signal $S_3$. Moreover, the time amount signal generation circuit 12 can have the distinction circuit that judges whether the output voltage $E_O$ is large or small compared with the reference voltage $E_{REF}$.

The phase-shift signal generation circuit 13 inputs the reference clock signal $S_0$. And, the phase-shift signal generation circuit 13 generates the set of n phase-shift signal $S_{41}$, $S_{42}$, ..., $S_{4n}$ that the phase delays only [one cycle $T_0$ of the reference clock signal $S_0$]/n one by one from the reference clock signal $S_0$.

The counter circuit 14 inputs n phase-shift signal $S_{41}$, $S_{42}$, ..., $S_{4n}$ when the time amount signal $S_3$ is active, counts the pulse numbers respectively synchronizing with the reference timing signal $S_1$, and outputs n count-values $N_{11}$, $N_{12}$, ..., $N_{1n}$ digitally.

The digital addition circuit 15 inputs n count-values $N_{11}$, $N_{12}$, ..., $N_{1n}$, adds these values, and outputs the adding value ADD digitally as a value that corresponds to the time amount signal $S_3$.

The switch element on-time decision circuit 16 inputs the adding value ADD, decides the on-time $T_{ON}$ of the switch element (not shown in the figure) of the electric power conversion circuit 100, and outputs $T_{ON}$ digitally as integral value $N_2$.

The control signal generation circuit 17 inputs n phase-shift signal $S_{41}$, $S_{42}$, ..., $S_{4n}$ synchronizing with reference timing signal $S_1$, generates the control signal $S_5$ n times accuracy of the reference clock signal $S_0$ corresponding to on-time $T_{ON}$.

Figure 2:
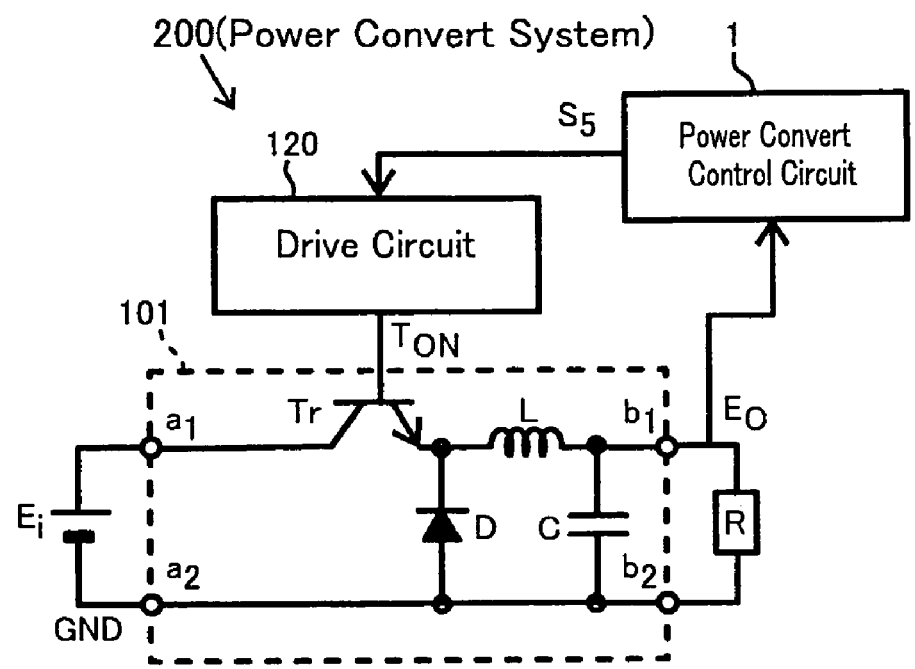
FIG. 2 is a diagram that shows the electric power conversion system mounted the electric power conversion control circuit of the present invention.

FIG. 2 shows the electric power conversion system 200 mounted the electric power conversion control circuit 1. The electric power conversion system 200 consists of the electric power conversion circuit (in FIG. 2, the electric power conversion circuit is the DC/DC converter 101 of step down type), the electric power conversion control circuit 1, and the drive circuit 120.

The DC/DC converter 101 consists of the transistor Tr for switching, the inductor L, the diode D, and the capacitor C. The transistor Tr and the inductor L are connected with the series between the input terminal $a_1$ and the output terminal $b_1$ (input terminal $a_2$ and output terminal $b_2$ are connected to the ground GND). The diode D is connected between the terminal on the inductor L side of the transistor Tr and the ground GND. The capacitor C is connected between the output terminal $b_1$ and $b_2$. In FIG. 2, the DC power $E_i$ is connected with the input side of the DC/DC converter 101 (between the input terminal $a_1$ and $a_2$), and the load R is connected with the output side (between the output terminal $b_1$ and $b_2$).

The electric power conversion control circuit 1 inputs the output voltage $E_O$ of the DC/DC converter 101, outputs the control signal S5 to drive circuit 120, and the drive circuit 120 sends driving signal to the transistor Tr of the DC/DC converter 101.

Figure 3:
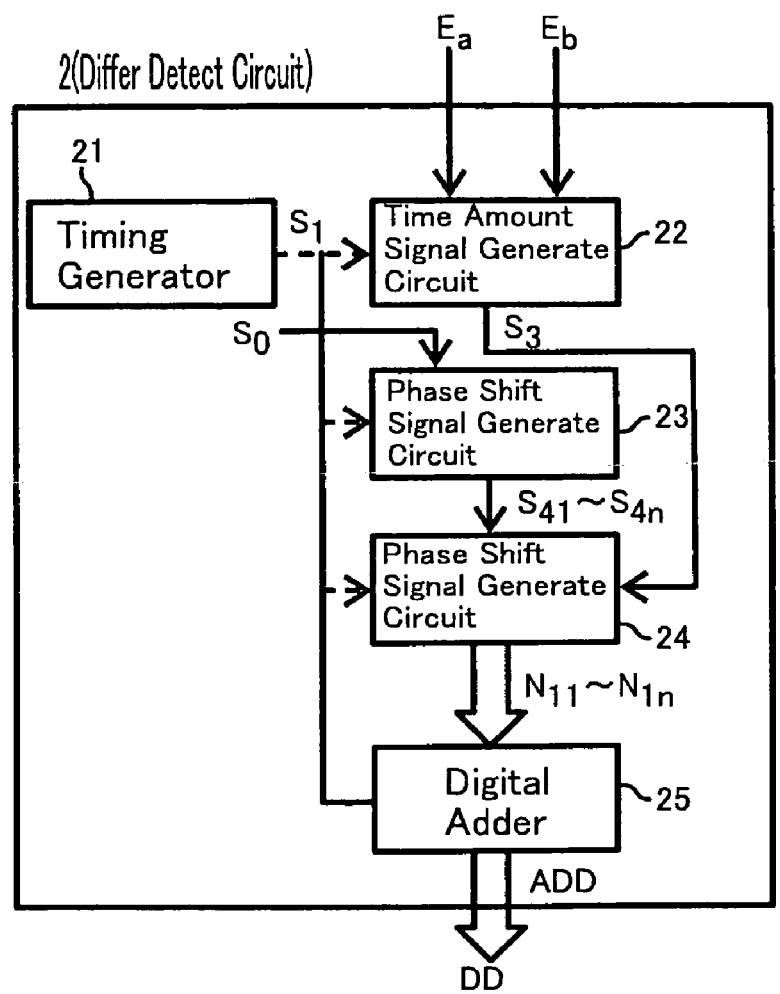
FIG. 3 is a block diagram that shows the electric power conversion control circuit in the application of the present invention.

FIG. 3 shows a block diagram of the difference detecting circuit that the present invention is applied.

In FIG. 3, the difference detecting circuit 2 consists of the timing generation circuit 21, the time amount signal generation circuit 22, the phase-shift signal generation circuit 23, the counter circuit 24, and the digital adding circuit 25.

The timing generation circuit 21 generates the reference timing signal $S_1$.

T the time amount signal generation circuit 22 inputs 2voltage signal $E_A$ and $E_B$, and generates the time amount signal $S_3$ corresponding to the difference $(E_B-E_A)$ synchronizing with reference timing signal $S_1$.

The phase-shift signal generation circuit 23 inputs the reference clock signal $S_0$, and generates the set of n phase-shift signal $S_{41}, S_{42}, \ldots, S_{4n}$ that the phase delays only [one cycle $T_0$ of the reference clock signal $S_0$]/n one by one from the reference clock signal $S_0$.

The counter circuit 24 inputs the time amount signal $S_3$ and n phase-shift signals $S_{41}, S_{42}, \ldots, S_{4n}$ when the time amount signal $S_3$ is active, counts these pulse numbers synchronizing with the reference timing signal respectively, and outputs n count-values $N_{11}, N_{12}, \ldots, N_{4n}$ digitally.

The digital adding circuit 25 inputs, adds n count-values $N_{11}, N_{12}, \ldots, N_{4n}$, and outputs this adding value digitally as a value corresponding to the time amount signal.

Figure 4:
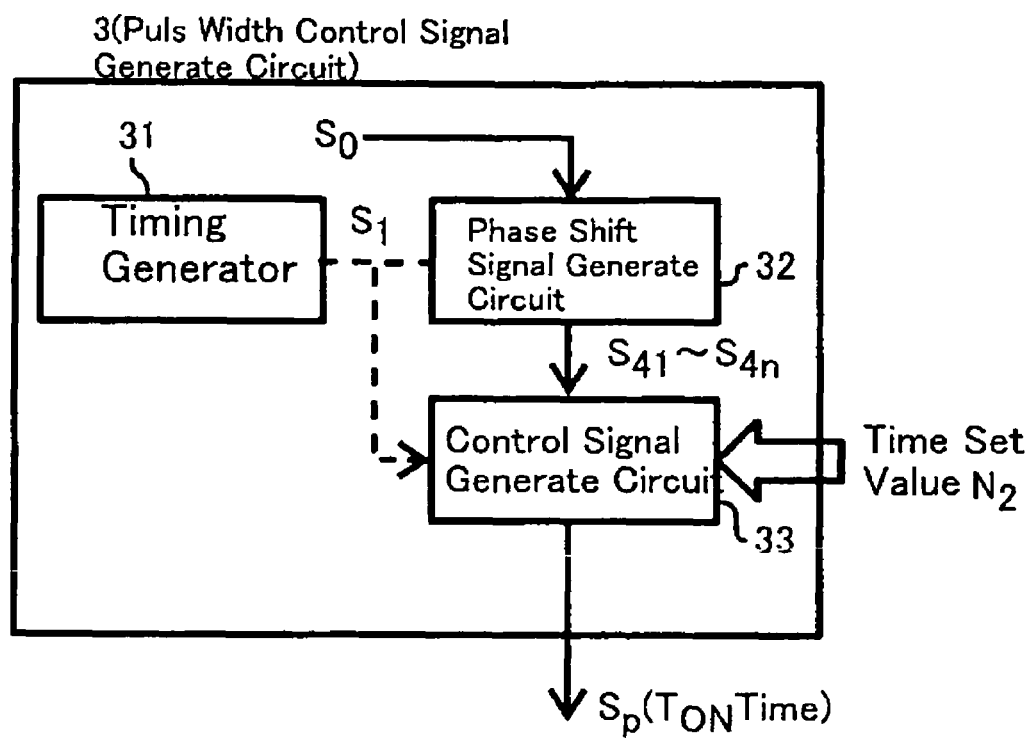
FIG. 4 is a diagram for explaining the pulse width control signal generation circuit in the embodiment of the present invention.

FIG. 4 shows a block diagram of the pulse width control signal generation circuit of the present invention.

In FIG. 4, the pulse width control signal generation circuit 3 consists of the timing generation circuit 31, the phase-shift signal generation circuit 32, and the control signal generation circuit 33.

The timing generation circuit 31 generates the reference timing signal $S_1$.

The phase-shift signal generation circuit 32 inputs the reference clock signal $S_0$, and generates n phase-shift signals $S_{41}, S_42, \ldots, S_{4n}$ that each phase delays one by one by [one cycle $T_0$ of the reference clock signal $S_0$]/n from the reference clock signal $S_0$. Moreover, the phase-shift signal generation circuit 32 consists of (n-1) delay circuits. Each delay circuit delays the phase one by one by [one cycle $T_0$ of the reference clock signal $S_0$]/n, and generates the phase-shift signals $S_{41}, S_{42}, \ldots, S_{4n}$.

The control signal generation circuit 33 inputs a time set value as integral value $N_2$, inputs n phase-shift signals $S_{41}, S_{42}, \ldots, S_{4n}$ based on reference clock signal $S_0$ synchronizing with the reference timing signal $S_1$, and generates the pulse width control signal $S_p$ (corresponding to the $T_{ON}$ time) of accuracy n time the reference clock signal corresponding to the time setting value (integer $N_2$).

MODE FOR CARRYING OUT THE (CLAIMED) INVENTION

The composition and the operation of the electric power conversion control circuit 1 mentioned above are explained by the circuit diagrams of FIG. 5-6, and the timing charts of FIG. 7-9 in detail as follows.

Figure 5:
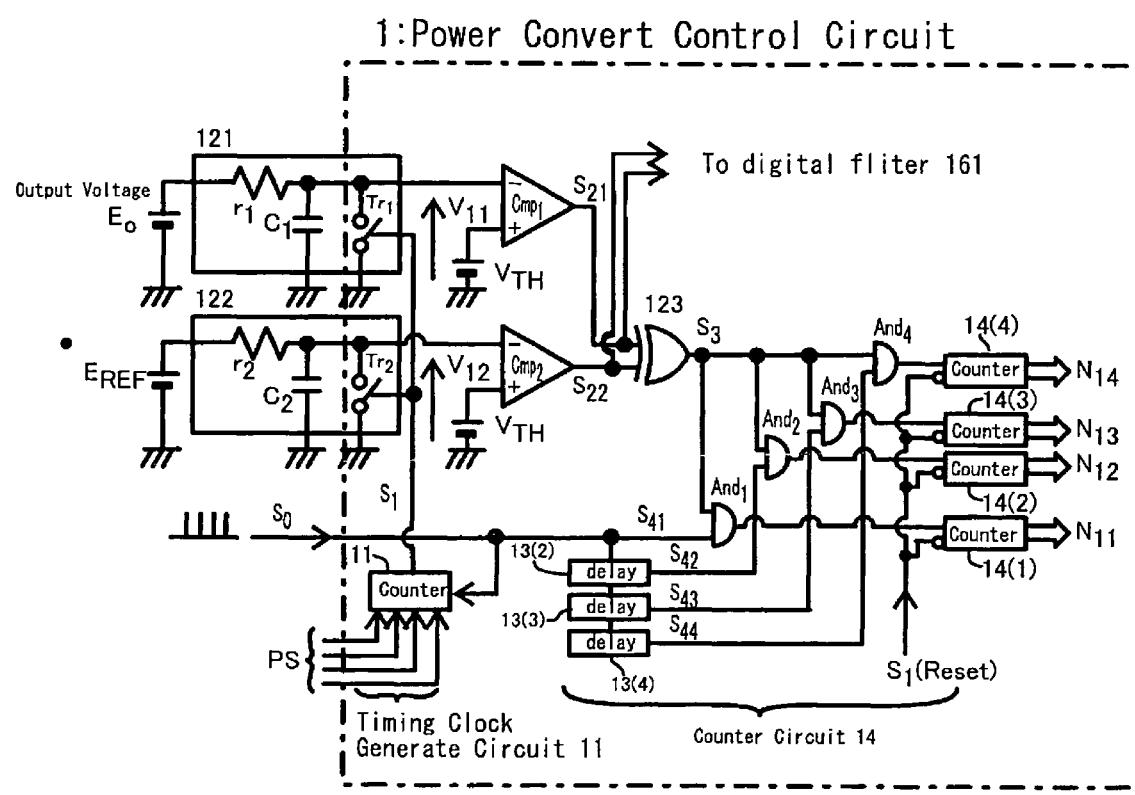
FIG. 5 is a diagram that shows the timing generation circuit, the time amount generation circuit, the phase shift circuit and the count circuit in the electric power conversion control circuit.
Figure 6:
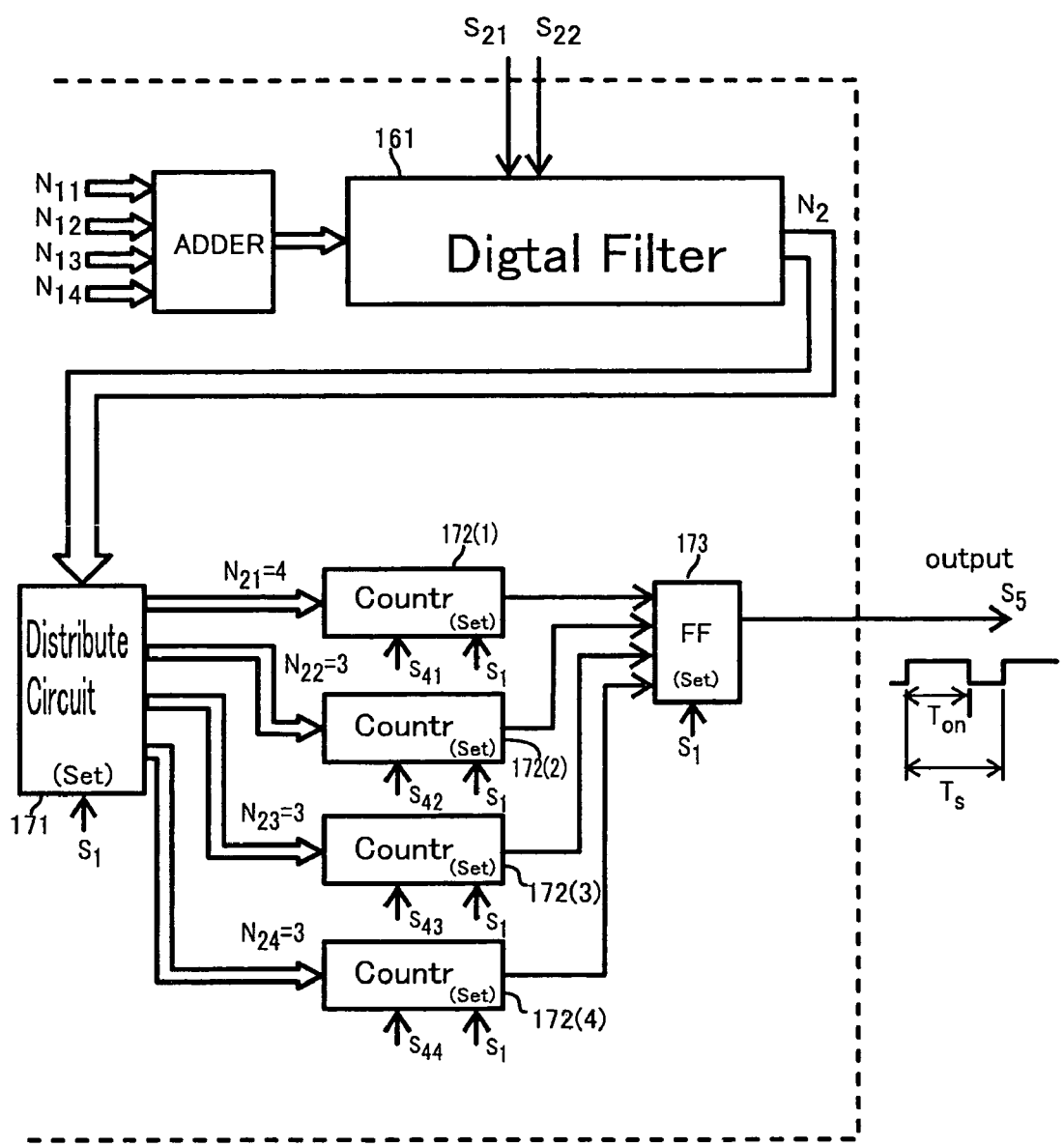
FIG. 6 is a diagram that shows the digital addition circuit, the switch element on-time deciding circuit and the control signal generation circuit in the electric power conversion control circuit.

FIG. 5 shows the timing generation circuit 11, the time amount signal generation circuit 12, the phase-shift signal generation circuit 13 and the counter circuit 14 included in the electric power conversion control circuit 1. Moreover, FIG. 6 shows the digital adding circuit 15, the switch element on-time decision circuit 16, and the control signal generation circuit 17.

The counter 111 generates the reference timing signal $S_1$ corresponding to the preset value (the digital value PS that is the setting value of the switching frequency). The on/off frequency of the control signal $S_5$ is decided by the frequency of the reference timing signal $S_1$ (100kHz order). Above on/off frequency is generated by the control signal generation circuit 17.

The reference timing signal $S_1$ is generated from the reference clock signal $S_0$ described later. The reference timing signal $S_1$ is sent to the transistor switch $Tr_1$ of the voltage input circuit 121 and the transistor switch $Tr_2$ of the voltage input circuit 122. The voltage input circuit 121 inputs the output voltage $E_o$, and the voltage input circuit 122 inputs the reference voltage $E_{REF}$. The counter 111 generates The counter 111 composes timing generation circuit 11 of FIG. 1.

The voltage input circuit 121 consists of the input resistance $r_1$, the capacitor $C_1$, the transistor switch $Tr_1$, and the comparator $C_{mp1}$. The output voltage $E_O$ is given to one side terminal of the input resistance $r_1$. The capacitor $C_1$ is connected between the other terminal and the ground. The reference voltage input circuit 122 consists of the input resistance $r_2$, the capacitor $C_2$, the transistor switch $Tr_2$, and the comparator $Cmp_2$. The reference voltage $E_{REF}$ is given to one side terminal of the input resistance $r_2$. The capacitor $C_2$ connects between the other terminal of the input resistance $r_1$ and the ground GND. The comparator $Cmp_2$ inputs the threshold value voltage $V_{TB}$. The reference timing signal is given to the transistor switch $Tr_1$ and $Tr_2$. Moreover, the output terminal of comparator Cmp1 and the output terminal of the comparator Cmp2 are connected to EXOR gate 123.

Figure 7:
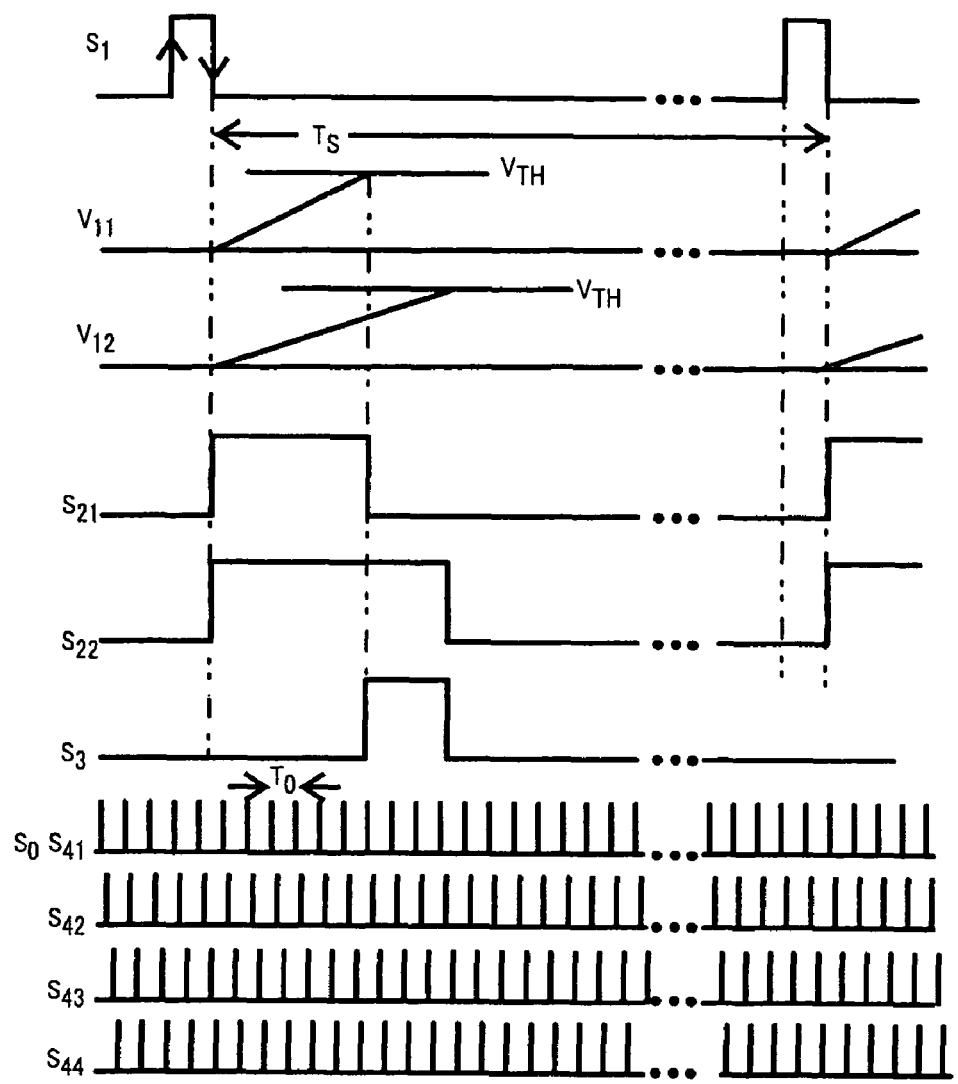
FIG. 7 is a timing chart for explaining the operation of the electric power conversion control circuit shown in FIG. 3 and FIG. 4.

When the reference timing signal $S_1$ turns off the transistor switch $Tr_1$ and $Tr_2$, as shown in FIG. 7, the voltage $V_{11}$ (the input signal of the comparator $Cmp_1$) of the capacitor $C_1$ rises and the voltage $V_{12}$ (the input signal of the comparator $Cmp_2$) of the capacitor $C_2$ rises. As shown in FIG. 7, the $S_{21}$ downs when the terminal voltage V11 reaches the threshold voltage $V_{TH}$, and the $S_{22}$ rises when the terminal voltage $V_{12}$ reaches the threshold voltage $V_{TH}$.

The input circuit 121 and the reference voltage input circuit 122 can be composed of the voltage controlled oscillator (VCO) that acts according to the timing of $S_1$. The input voltage is higher, so the voltage controlled oscillator (VCO) outputs the first pulse earlier. Therefore, the VCO that the oscillation cycle is large can be operated as well as the above integration circuit. Moreover, the output of EXOR gate 123 ( time amount signal $S_3$) outputs the time difference between the down edge of the signal $S_{21}$ and the down edge of $S_{22}$ as shown in FIG. 7.

The signal $S_{21}$ and $S_{22}$ are input to the digital filter 161 described later, and the digital filter 161 detects a time relation of the down edge of signal $S_{21}$ and the down edge of $S_{22}$. The voltage input circuit 121, the reference voltage input circuit 122, and the EXOR gate 123 compose the circuit 12 of the time amount generation signal in FIG. 1.

Three delay circuits 13(1), 13(2), 13(3) delay the phase one by one by [one cycle of the reference clock signal $S_0$]/4 to the reference clock signal $S_0$ (in FIG. 7, it is the phase-shift signal $S_{41}$), and generate the phase-shift signal $S_{42}, S_{43}, \ldots, S_{44}$. The signal line of reference clock signal $S_0$ (the signal line of the phase-shift signal $S_{41}$) and three delay circuits 13(2), 13(3), 13(4) compose the phase-shift signal generation circuit 13 in FIG. 1.

The output signal of the EXOR gate 123 (the time amount signal $S_3$) is input to one side input terminal of the AND gate ($And_1, And_2, And_3,$ and $And_4$), and the phase-shift signals ($S_{41}, S_{42}, S_{43}, S_{44}$) are input to the other input terminal of the AND gate ($And_1, And_2,$ and $And_3, And_4$) respectively.

The AND gate ($And_1, And_2, And_3,$ and $And_4$) outputs the logical product of these input signals by the pulse respectively.

The counter (parallel conversion type) 14(1), 14(2), 14(3), 14(4) counts the output pulses from the AND gate ($And_1, And_2, And_3,$ and $And_4$) respectively and outputs the count values ($N_{11}, N_{12}, N_{13}, N_{14}$) as digital signal respectively.

Figure 8:
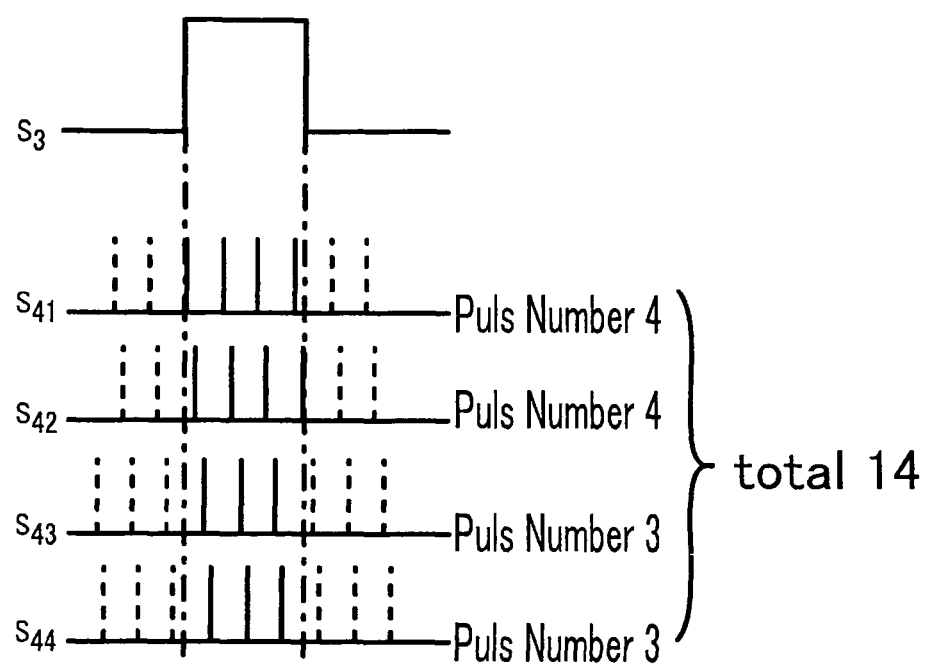
FIG. 8 is timing chart explaining the operation of the electric power conversion control circuit shown in FIG. 3 and FIG. 4.

In FIG. 8 indicates the case that the count value $N_{11}$ is "4", $N_{12}$ is "4", $N_{13}$ is "3" and $N_{14}$ is "3". The counter (14(1), 14(2), 14(3), 14(4)) and the AND gate ($And_1, And_2, And_3,$ and $And_4$) compose the counter circuit 14 of FIG. 1. The count value ($N_{11}, N_{12}, N_{13}, N_{14}$) is output to the adding circuit ADDER as shown in FIG. 6, and the adding circuit ADDER outputs the total value "$N_{11}+N_{12}+N_{13}+N_{14}(4+4+3+3=14)$" as the adding value ADD. This adding value ADD is a value (that is, the value corresponding to the difference of the output voltage $E_O$ to the reference voltage $E_{REF}$) corresponding to time amount signal $S_3$ mentioned above. The adding circuit ADDER composes the digital adding circuit 15 shown in FIG. 1.

The digital filter 161 inputs the adding value ADD, decides the on-time $T_{ON}$ of the switch elements of the DC/DC converter 101 (refer to FIG. 2) as a integer value, and outputs the on-time $T_{ON}$ as integer values $N_2$.

Moreover, digital filter 161 can preset the offset value, the gain, and the cutoff frequency, etc.

In addition, the digital filter 161 inputs the signal $S_{21}$ and $S_{22}$ as mentioned above, and judges the time relation of the down edge of $S_{21}$ and the down edge of the signal $S_{22}$ (that is, the output voltage $E_O$ of the electric power conversion circuit 100 is whether larger or smaller than the reference voltage $E_{REF}$).

For instance, the output of digital filter 161 (integer value $N_2$) is a value corresponding to the control quantity like $$[A/(1+S\tau)] \times (E_{REF}-E_O)$$

(A: constant, s: Laplace operator, τ: time constant)

The output of the digital filter 161 corresponds to the on-time of the next cycle of the reference timing signal $S_1$. The digital filter 161 composes the switch element on-time decision circuit 16 in FIG. 1.

The distribution circuit 171 distributes the on-time $T_{on}$ input to four integers $N_{21}, N_{22}, N_{23}, N_{24}$.

The four integers $N_{21}, N_{22}, N_{23}$ satisfy the following expression, $$N_{21}+N_{22}+N_{23}+N_{24}=N_2$$

$$N_{21} \geq N_{22} \geq N_{23} \geq N_{24}$$

Figure 9:
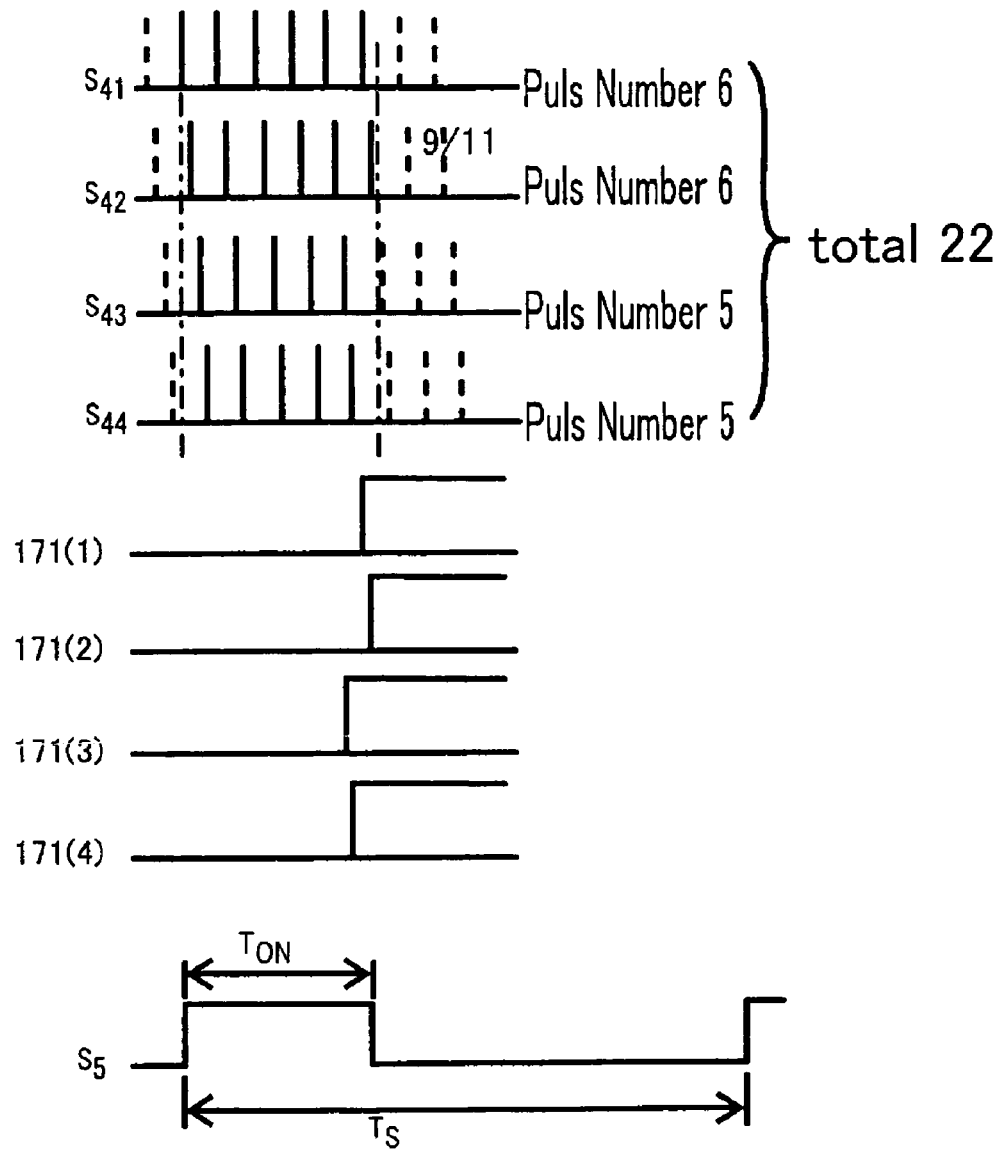
FIG. 9 is another timing chart explaining the operation of the electric power conversion control circuit shown in FIG. 3 and FIG. 4.

In the present embodiment, when $N_2$ is 22 ($N_2=22$) it becomes $N_{21}=6, N_{22}=6, N_{23}=5$, and $N_{24}=5$ in as shown in FIG. 9.

Four counters 172(1), 172(2), 172(3), 172(4) are down counters, integer $N_{21}, N_{22}, N_{23}$, and $N_{24}$ are preset in each counter. When the pulses of the number preset are input, each counter outputs the pulses that the phase delays [one cycle of the reference clock signal $S_0$]/4 one by one.

The pulse synthesis circuit 173 (flip-flop register FF) is set by the reference timing signal $S_1$, outputs the rising edge (up edge) of the control pulse S5. The pulse synthesis circuit 173 outputs the down edge of the control signal $S_5$ by the last pulse that counter s(172(1), 172(2), 172(3), 172(4)) output.

The distribution circuit 171, the counter (172(1), 172(2), 17(3), 172(4)), and the pulse synthesis circuit 173 compose the control signal generation circuit 17 in FIG. 1.

It explains the embodiment of the present invention more in detail as follows.

Figure 10:
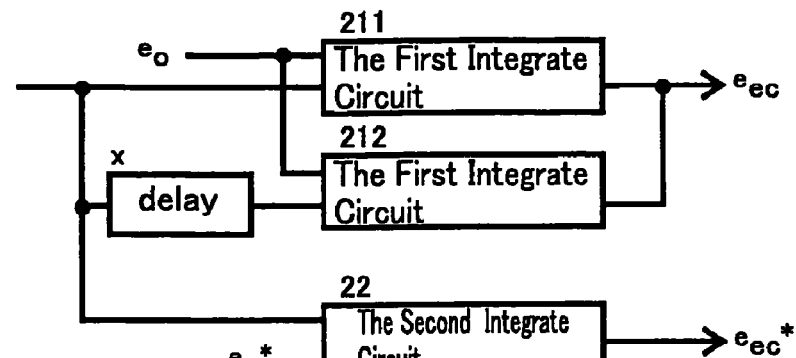
FIGS. 10(A),(B),(C) are the diagrams that show another embodiment for improving the high accuracy and the speed-up.
Figure 10:
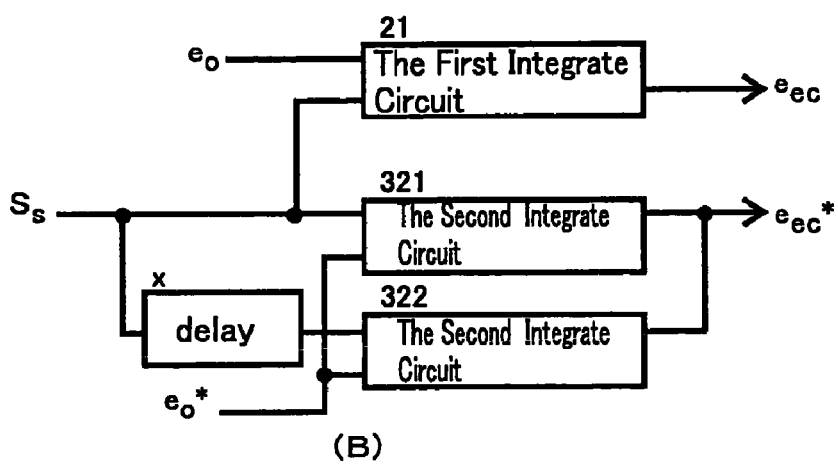
Figure 10:
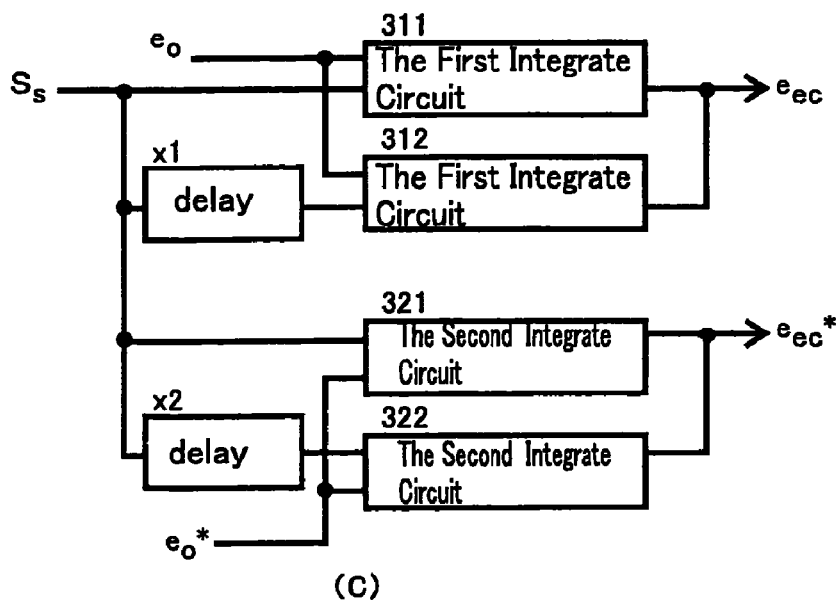

As shown in FIG. 10(A), the first integration circuit (for the voltage detection) 211, 212 of N(It is N=2 here) can be used. By delaying the operation timing of the first integration circuit 211 and 212 for the time of Tp/N by the delay x, the accuracy of the voltage detection rises, and the operation is speed-up. Moreover, the first integration circuit (for the voltage detection) 211, 2222 of N(N=2) and the second integration circuit (for the voltage detection) 221,222 of N(N=2) can be used as shown in FIG. 10(C). By shifting the operation timing of the integration circuit 211, 212, 221, 222 for the time of Tp/N by the delay x, the accuracy of the voltage detection rises, and the operation is speed-up.

In the said example, the voltage deviation will be detected once in one cycle of the on-off of the transistor switch (the digital numerical value NRM to control the current control circuit 3 is detected once). However, the numerical value $N_{RM}$digital may be detected two or more times in one cycle of the first clock $S_e$ as shown in FIG. 11.

Figure 11:
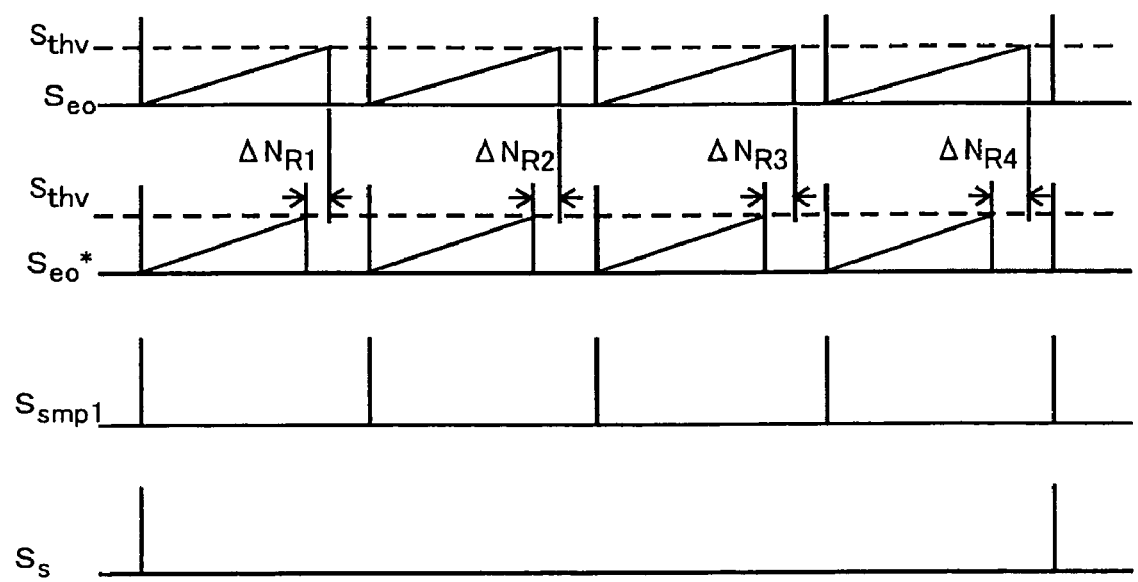
FIG. 11 is a timing chart that shows the operation of the first integration circuit for the voltage detection and the second integration circuit for the voltage detection.

In FIG. 11, the difference ΔNR of the coefficient value recorded will be detected two or more times (The measurement value is indicated four times here it with ΔNR1, ΔNR2, ΔNR3, and ΔNR4) in one cycle $T_e$ of the first clock $S_e$.

The invention claimed is:

1. A pulse width control signal generation circuit that generates control signals corresponding to on-time of a switch element, comprising, a phase shift signal generation circuit that inputs a reference clock signal, and generates a group of signals that consists of n phase shift signals that phase delay one by one by [one cycle of the reference clock signal]/n, (n: positive integer), a first reference timing generation circuit that generates a first reference signal, a control signal generation circuit that inputs said n phase shift signals synchronized with a second reference timing signal, and generates the control signal of accuracy n time the reference clock signal corresponding to said on-time, wherein, said control signal generation circuit has, a distribution circuit that distributes on-time value $N_2$ to integers $N_{21}, N_{22}, N_{23}, \ldots, N_{2n}$, so that the following requirement is met $$N_{21}+N_{22}+\ldots+N_{2n}=N_2 \text{ where } N_{21} \geq N_{22} \geq \ldots \geq N_{2n}$$

n counters that output a number of pulses corresponding to a value that is preset for a phase to delay [one cycle of the reference clock signal]/n one by one, a pulse synthesis circuit that synthesizes output pulses of said counters, and outputs a synthesized signal as the control signal.

2. The pulse width control signal generation circuit of claim 1 wherein, said phase shift signal generation circuit consists of delay circuits, and each delay circuit delays the phase one by one by [one cycle of the reference clock signal]/n, and generates said phase shift signal.

3. An electric power conversion control circuit using said pulse width control signal generation circuit of claim 1 wherein, a second timing generation circuit generates the second reference timing signal, a time amount signal generation circuit inputs a reference voltage and an output voltage of a power conversion circuit and generates a time amount signal corresponding to a difference between said reference, and said output voltage synchronized with said second reference timing signal, a count circuit that inputs n phase shift signals, counts these pulse numbers respectively synchronized with the first reference timing signal, and outputs n count-values digitally when amount of signal of time is active, the digital addition circuit that inputs said n count-values, adds these values to obtain an adding value, and outputs the adding value as a value corresponding to said time amount signal, a switch element on-time deciding circuit that inputs said adding value, decides said on-time, and outputs as an integer value.

4. The electric power conversion control circuit of claim 3, wherein, said count circuit has, n AND-gates that input said time amount signal input to a first terminal and said phase shift signal input to a second terminal, and output a logical product, and n counters that count the output pulse from said n AND-gate, respectively, and output each count value digitally.

5. The electric power conversion control circuit of claim 3, wherein, said electric power conversion control circuit is a DC/DC converter.

6. LSI for electric power conversion control that is packaged from the electric power conversion control circuit of claim 3.

* * * * *